United States Patent [19]

Warden

[11] 4,176,438
[45] Dec. 4, 1979

[54] METHOD FOR PRODUCING INTEGRALLY SEALED BILLETS FROM SCRAP METAL WITHOUT FULLY REMELTING THE METAL

[76] Inventor: A. Jack Warden, 945 Ravine Dr., Youngstown, Ohio 44505

[21] Appl. No.: 818,231

[22] Filed: Jul. 22, 1977

[51] Int. Cl.$^2$ .............................................. B22F 3/16
[52] U.S. Cl. .................................... 29/403.1; 266/901; 29/403.3
[58] Field of Search ...................... 29/403, 420, 420.5; 266/901

[56] References Cited

U.S. PATENT DOCUMENTS

| | | | |
|---|---|---|---|
| 2,211,984 | 8/1940 | Paterson | 29/403 |
| 3,626,577 | 12/1971 | Trible | 29/403 |
| 3,783,494 | 1/1974 | Whalen et al. | 29/403 |
| 4,067,096 | 1/1978 | Whalen, Jr. | 29/403 |

Primary Examiner—Francis S. Husar
Assistant Examiner—V. K. Rising

Attorney, Agent, or Firm—Cushman, Darby & Cushman

[57] ABSTRACT

A columnar stream of scrap particles having about 15-25 percent full density, is electrically inductively heated in a reducing atmosphere while being laterally confined by walls which are not made so hot as to become tacky or adhere to the confined column of scrap particles. The heated stream is laterally squeezed to increase its density to about 40-50 percent full density and is pulled downwards, out of extensive confinement by such walls. It is then inductively heated in a reducing atmosphere to a higher temperature than in the prior induction heating step, and squeezed to a greater extent, sufficiently to form a fully dense layer about the whole of the outer peripheral surface of the stream. By preference, insufficient heat and/or pressure are used to condense the stream to a fully dense condition right to its core. If this stream does not continue directly into another continuous process, it is severed into a succession of billets each end of which is sealed to prevent internal oxidation of the billets.

21 Claims, 1 Drawing Figure

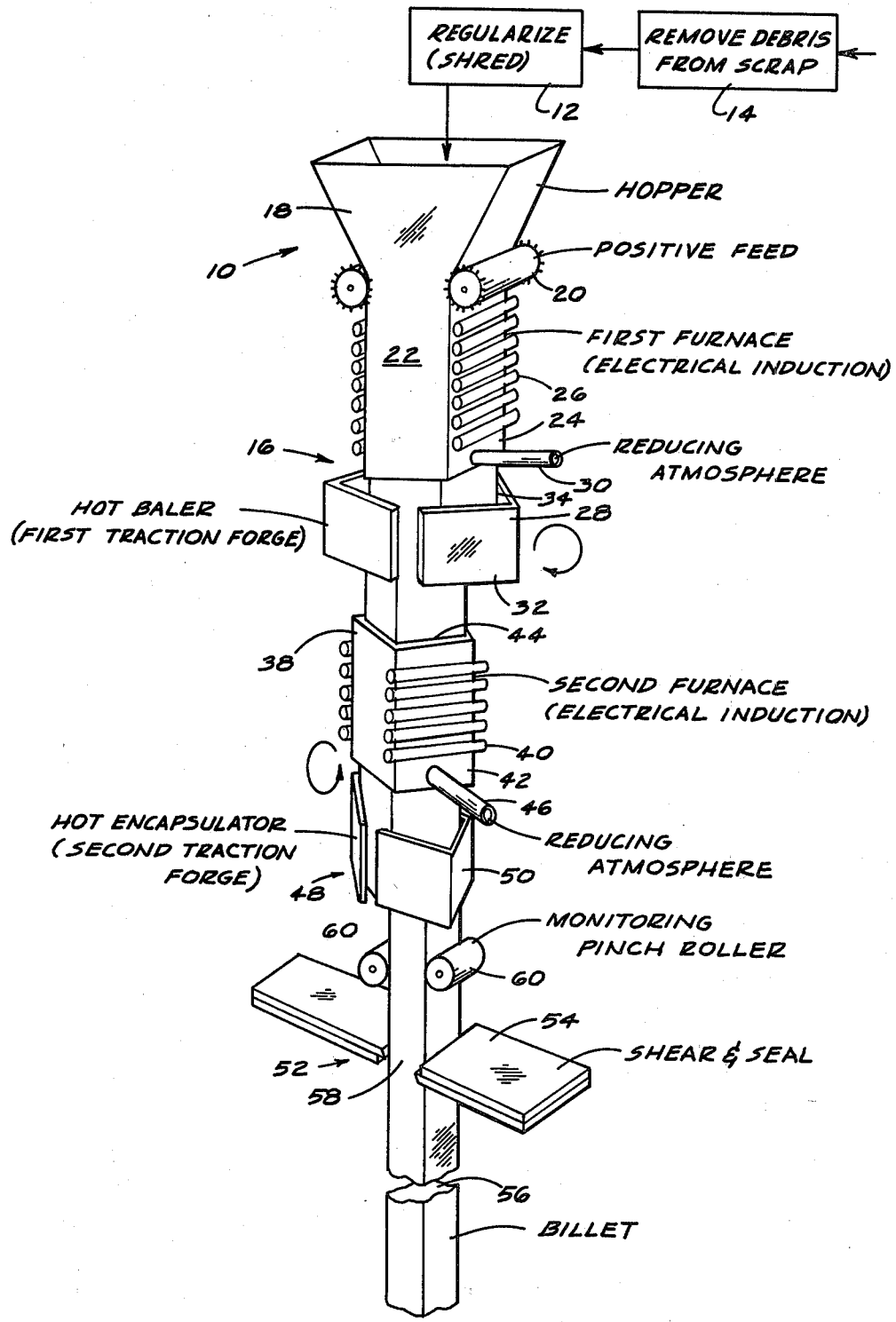

4,176,438

METHOD FOR PRODUCING INTEGRALLY SEALED BILLETS FROM SCRAP METAL WITHOUT FULLY REMELTING THE METAL

BACKGROUND OF THE INVENTION

The invention described herein is a direct development of the one that is fully described in the co-pending application, Ser. No. 631,409, of Mark Edward Whalen, now U.S. Pat. No. 4,067,096, issued Jan. 10, 1978. Rather than repeat its contents here, it is the inventor's intention that the disclosure thereof be directly consulted for all of its contents, by any concerned person, just as if such had been set forth in extenso here.

In the closest other precursors of the present invention known to the inventor, the resulting billet is either (a) less than fully dense, throughout, including the outer peripheral surface thereof, so it is vulnerable and subject to corrosion, or (b) it is fully dense throughout. According to the present inventor's view, in the latter instance the additional heat and/or pressure required to fully densify the product is a waste of energy.

The prior art processes in which scrap fragments are loaded into a pre-formed shell (called a "coffin" in the art) for pressing and/or heating to form a "billet" seem most likely to produce a product most similar to that provided by use of the process of the present invention. However, that is not the case. In fact, in those processes, the fully dense layer only partially peripherally surrounds the core and/or the core is not sufficiently centralized as to avoid problems should one try to roll the resulting "billet" into sheet. In the latter case, because some voids remain near the lateral margins, they may pop open during rolling. The resulting uneven edges of the strip will catch in side guides of the rolling mill and cause the strip to cobble.

The above-mentioned co-pending application describes a process wherein:

(a) heating is accomplished at least largely by electrical induction of a metal scrap stream that is so low-density that its outside gets hot enough to weld long before the inside gets that hot, and (b) heating and pressing are carried out sufficiently to seal the outer peripheral surface of the "billet", but not significantly more heat and pressure are wasted to make the billet fully solid at this stage.

In seeking to put that invention into commercial practice, a practical problem has been encountered. It is necessary to laterally confine the columnar stream of scrap particles during the induction heating step, because it is so much below full density.

As in many such processes, there is a trade-off between pressure and temperature. The higher the temperature to which the scrap is heated, the lower will be the minimum pressure needed to consolidate the heated scrap into the desired product. Conversely, the lower the temperature to which the scrap is heated, the greater will be the minimum pressure needed to consolidate the heated scrap into the desired product.

A typical wall material that is available is non-magnetic stainless steel, as it is not inductively heated.

At a temperature of about 1980° F., the non-magnetic stainless steel gets "tacky" and begins to tentatively weld to the scrap column.

That provides a temperature constraint on conducting the process, and may necessitate the use of uneconomically sturdy pressure applying means and unacceptably great force application to be commercially practicable.

SUMMARY OF THE PRESENT INVENTION

The present invention provides a solution to the above-described problem. The heating and pressing steps are divided into a first set and a second set. In that way the scrap can be laterally supported when it needs to be, at which stage it lies below the tacky temperature of the confining walls. By the stage the second set is conducted, the scrap has become sufficiently dense that it does not need such extensive lateral support, so it may be inductively heated to a higher temperature without danger of becoming tentatively welded to the processing equipment. Because the scrap can be heated hotter in this second set, less pressure is needed to accomplish the desired amount of consolidation.

A columnar stream of scrap particles having about 15-25 percent full density, is electrically inductively heated in a reducing atmosphere while being laterally confined by walls which are not made so hot as to become tacky or adhere to the confined column of scrap particles. The heated stream is laterally squeezed to increase its density to about 40-50 percent full density and is pulled downwards, out of extensive confinement by such walls. It is then inductively heated in a reducing atmosphere to a higher temperature than in the prior induction heating step, and squeezed to a greater extent, sufficiently to form a fully dense layer about the whole of the outer peripheral surface of the stream. By preference, insufficient heat and/or pressure are used to condense the stream to a fully dense condition right to its core. If this stream does not continue directly into another continuous process, it is severed into a succession of billets, each end of which is sealed to present internal oxidation of the billets.

The principles of the invention will be further discussed with reference to the drawing wherein a preferred embodiment is shown. The specifics illustrated in the drawing is intended to exemplify, rather than limit, aspects of the invention as defined in the claims.

BRIEF DESCRIPTION OF THE DRAWING

In the Drawing, the FIGURE is a tabular flow chart including a schematic showing of apparatus for conducting the process steps of the present invention.

DETAILED DESCRIPTION OF THE PRESENTLY PREFERRED EMBODIMENT

The Scrap

Although, in general, the processing steps of the invention may be conducted upon scrap particles of varied composition and physical size, the process was developed for processing steel sheet scrap and other uses are believed to pale in economic significance compared to this one. Accordingly, most exemplification of processing parameters given herein, such as particular temperatures are germain to processing of steel scrap. However, from the teachings herein and the principles set forth, those skilled in processing metal scrap of other compositions should be able to make effective use of the invention.

Of the rolled steel sheet entering the typical automobile manufacturing plant as raw material for the stamping presses, 20 to 40 percent winds up as scrap—from trimmings, cut-outs, punchings, defective pressings and the like. The volume of this scrap is so great it must be removed regularly and frequently, or its accumulation chokes plant operations. In the trade, such steel sheet scrap, typically 0.035 to 0.090 inch thick, is known as "prompt scrap" (because haulers contract clauses normally require that the successful bidder remove it from the plant promptly), or as "bushlings" (because it is typically accumulated in a loose condition, not in bushel baskets, but e.g. in rail cars or truck trailers).

As a preliminary step to conducting the process of the present invention, such scrap is "regularized", for instance by being passed through conventional shears or shredders and between corrugated or dimpled rolls. In consequence, the scrap has the following presently preferred size distribution on a weight basis:

TABLE I

| Length by width (inches) | Predominance (percent) |
| --- | --- |
| 4 × 4 | 5 |
| 3 × 3 | 5 |
| 2 × 4 | 20 |
| 2 × 2 | 20 |
| 2 × 2 | 10 |
| 1 × 1 | 10 |
| Smaller | 10 |

There is also widely available a lower quality of steel scrap known as "obsolete scrap", which, typically, includes everything made from steel that can be separated out by electromagnetic means at an automotive, industrial or municipal scrap recycling facility. Thus it may contain shredded automotive engine blocks, shredded household white goods, and the like, including some which may be considerably oxidized. If not received in a shredded condition, such scrap must be "regularized" by shredding or the like. So that, typically, it consists of a range of piece sizes up to about the size of a small fist.

It would be unusual to use shredded obsolete scrap as the entire input for conducting the process of the present invention, since the resulting product would be of low quality, e.g., "no grade" steel good for manufacture into re-bar and the like. More typically, such shredded obsolete scrap would be combined with regularized prompt scrap or bushlings as a mixed feed for the process of the present invention. In such instances, the predominance of shredded obsolete scrap in the mixture would be on the order of 0 to 20 percent.

Some further preliminary processing of the scrap input may be needed. For instance, some of the scrap may remain coated with or laminated to paint, lacquer, rubber, plastics, porcelain or the like. Although most of this would burn off while the process is conducted, observance of air pollution control laws may unacceptably encumber the processing equipment with fume collection devices. Accordingly, as an alternative, often it may be best to pre-treat the scrap input to chemically react, abrade, melt, pyrolyze or otherwise remove such debris from the scrap. By providing a separate pre-treatment, air pollution abatement needed is more easily accommodated.

Of course, in a fully continuously run process 10 the scrap size-reduction equipment 12, such as shredders, and the debris removing equipment 14, such as a kiln tunnel may be provided in line upstream of the continuous hot bailer 16.

At the station of the continuous hot bailer 16, the regularized scrap is fed into the hopper 18 to provide a continuous supply into the upper end of the tower of the first furnace 22.

A positive feed in the form of power-driven rolls 20 protrudes into the throat where the hopper 18 joins the furnace 22 and is driven to avoid hanging-up or bridging across of groups of particles (i.e. haystacking). A detailed description of suitable apparatus is found in my aforesaid co-pending application.

In the preferred embodiment the furnace 22 is an electric induction furnace with a substantially rectangular transverse cross-sectioned vertical lumen tubular tower liner 24. This provides a replaceable wear liner for the lateral margins of the scrap column to rubbingly guide against and be laterally supported by during descent of the scrap column.

The best material for the liner currently known to the inventor is non-magnetic stainless steel. That material is sufficiently durable relative to its replacement cost and ease of replacement; it is not inductively heated, and is useful is contact with hot steel scrap (unless heated to a temperature of about 1980° F.).

An electric induction coil 26 with an alternating current electric supply at e.g., 25–1000 hertz surrounds the liner 24 (with a layer of conventional refractory material, not shown, interposed therebetween for protecting the coils from the heat). For a furnace capable of processing five tons of scrap per hour, heating the descending scrap column in the first furnace to a temperature at its lateral margins of from about 1350° F. to about 1950° F. (for the above-mentioned reason), uses 1,300 to 2,000 kwh of power. The slope of the temperature gradient across the scrap column, from outside/in is directly related to decreasing electrical power frequency. The hotter, the thicker the outer peripheral surface portion is raised, the more easily and fully densified it becomes when laterally squeezed and longitudinally pulled at the first traction forge station 28.

Presently the relative capital costs of achieving a scrap column in the first stage, sufficiently densified in its outer peripheral region for a given traction forge squeezing and pulling operation as to not require extensive lateral support while the second stage (hot encapsulation) is performed, is approximately as follows:

TABLE 2

| Frequency (hertz) | Relative Capital Cost (percent) |
| --- | --- |
| 25 | 115 |
| 60 | 100 |
| 180 | 115 |
| 1000 | 120 |

The presently preferred frequency range is 180–360 hertz.

A typical liner 24 lumen measures 10 inches by 12.5 inches (125 square inches). When the scrap supply to the first stage is 15–25 percent full density, and the electric current frequency is 60 hertz, with a target of 1950° F. lateral surface temperature for the scrap column, at a level 1.75 inches deep into the scrap column, the temperature achieved in the first stage furnace is about 1850° F., for this 5 ton/hour throughput example, and the core center target temperature is about 1350° F.

Within the first stage furnace, at all points where the scrap column is above 900° F., it is bathed in a reducing atmosphere. One way of providing such an atmosphere is to provide direct fired burners located in or exhausting into the lumen of the first stage furnace, as at 30, but provided with a deficiency of oxygen for self-generating a reducing atmosphere. Such a way is further described in the aforesaid co-pending patent application.

Another way is to direct into the lumen at 30 a commercially available or otherwise pre-manufactured reducing atmosphere such as HNX or DX, available from such suppliers as Linde, Airox or Dryox.

The traction forge 28 of the first bailer typically is equipped with a 150 horsepower A.C. motor, the drive train of which includes a variable speed electric clutch. The physical details of a workable traction force are described in the aforesaid co-pending application. Another likely useful design of traction forge is described in the U.S. Patent of T. Sendzimir, U.S. Pat. No. 3,333,452, issued Aug. 1, 1967.

In general, the traction forge includes two laterally opposed, concave (each two sides of a square) shoes 32 eccentrically mounted and driven to engage two laterally opposite sides of the first-stage heated scrap column emerging below the first furnace 22, squeeze it to form a column whose corners are displaced 45 degrees about a horizontal plane from before, and measuring 7 inches by 7 inches (49 square inches, physically reduced from 10 inches by 12.5 inches or 125 square inches).

The shoes 32 are faced with replacealbe inserts 34, e.g. made of Stelite weld material.

The eccentric movement of the shoes cyclically forces them into squeezing relation with the scrap column, to squeeze with a pressure of about 6500 p.s.i. to about 12,500 p.s.i., then pulls the squeezed scrap column downwardly typically 0.1833 to 0.11 inch per stroke (requiring an operating rate of 150 to 250 r.p.m. for the traction forge units), retreats away from the scrap column, moves back upstream and reengages for the next squeezing stroke.

In the first stage the degree of full density of the scrap column is typically raised from an average of 18 percent full density to an average of 45 percent full density for a scrap column that emerges from the first stage at an average rate of about 130 linear feet per hour.

The traction forge of the hot bailer (the first stage) feeds the scrap column downwards into the furnace of the hot encapsulator 36 (the second stage). Here a second furnace 38, also perferably an electric induction furnace heats the scrap column to a higher temperatemn than in the first stage (typically to a laterally exterior temperature of about 1950° F. to about 2450° F.). To accomplish this, the second furnace 38 is furnished with 1000–1500 kwh of electricity at 25–180 hertz, preferably 60 hertz. The second furnace may not require a replaceable wear surface-providing liner such as is used in the first stage furnace because, preferably the scrap column when within the second furnace is sufficiently consolidated in the outer peripheral region thereof as to not need extensive lateral support. Thus, by preferance the second stage furnace includes electric induction coils 40 shielded by a layer of conventional refractory material 42. The lumen 44 is preferably so dimensioned (e.g. 8 inches by 8 inches, coaxially with the scrap column input thereto) as to be spaced from and out of sliding, engaging contact with the laterally exterior surfaces of the scrap column input thereto.

As in the first stage, a reducing atmosphere is provided for within the second stage at 46. Preferably, in the second stage furnace the scrap column is heated to temperature at the laterally exterior surface of 2450° F., ranging downwards as one proceeds to the laterally inwards to the longitudinal centerline, to about 1600° F.

The traction forge 48 of the second stage typically is substantially like the one (28) of the first stage in design, except for size and capacity. Typically it is equipped with a 400 horsepower A.C. motor, the drive train of which includes a flywheel (so the second stage traction forge sets the pace which pace the chutch of the first stage traction forge equips the latter traction forge to follow).

The second stage traction forge drive preferably operates at about 100 to about 200 r.p.m. for advancing the scrap column downwards by about 0.24 to about 0.12 inch per stroke.

The shoes 50 of the second stage traction forge are displaced 45 degrees about a horizontal axis from those of the first and, typically, squeeze the scrap column to a lateral square figure of 5 inches by 5 inches (25 square inches, a reduction from the 49 square inches which emerged from the first stage). The lateral squeezing force applied by the second stage traction forge, measured at the exterior faces of the scrap column, is from about 15,000 p.s.i. to about 35,000 p.s.i. and this provides a rate of emergence of scrap column from the second stage traction forge of from 120 lineal feet per hour to about 170 lineal fee per hour. Typically the emerging scrap column is of 90 percent full density, as an average across the entire cross-sectional area thereof. However, the percentage full density varies from the outer peripheral region, at least about 1/16 inch thick and up to about ¾ inch thick is fully dense, to provide an integral self-capsule for the less-dense central core, which ranges down to about 80 percent full density geometrically longitudinally centrally thereof.

At so high as 2450° F., the exterior peripheral surface portion of the scrap column, e.g. to a depth of 1.75 inches is easily and reliably consolidated to full density using the traction forge as described above.

Sometimes the process equipment described thus far will likely be provided in line with some continuous metal working process such as a sheet rolling mill, in which case the scrap column emerging from the second stage may provide a continuous supply thereto, without being severed into billets.

However, if there is a need to break the chain of continuously run processing steps at this point, a station 52, means are provided for intermittently, periodically shearing or otherwise severing the downwardly moving scrap column transversally to provide a succession of individual billets. By preference, the shear 54 also squeezes each billet end at 56 while creating it, at 58, sufficiently to completely seal each billet end so that, including the peripheral surface and each end, each billet is completely self-encapsulated, thus preventing internal oxidation during any cooling and subsequent reheating for further processing. The billet length is a matter of choice.

By preference, between the second stage electric induction furnace/traction forge set and the shear 54, one or two sets of two rolls 60 is or are driven in contact with two or four respectively opposed laterally exterior surfaces of the downwardly moving scrap column. These rolls may be used for smoothening these surfaces and/or be instrumental for monitoring lineal output rate of the system, using conventional pick-up and recording means. The sensed rate may provide a feed-back control for the traction forge operating motor of the second stage, using conventional circuitry.

It should now be apparent that the method for apparatus for producing integrally sealed billets from scrap metal without fully remelting the metal as described hereinabove, possesses each of the attributes set forth in the specification under the heading "Summary of the Invention" hereinbefore. Because it can be modified to some extent without departing from the principles thereof as they have been outlined and explained in this specification, the present invention should be understood as encompassing all such modifications as are within the spirit and scope of the following claims.

I claim:

1. A method for producing an integrally sealed, but not fully dense billet from scrap metal fragments without fully remelting the scrap metal thereof, comprising:

loading into a hopper a supply of scrap metal particles having an average particle size that is larger than powder at a sufficient rate to continuously provide a columnar supply of scrap metal particles issuing from the hopper, with an average of about 15–25 percent full density;

while laterally confining an increment of said column in the lumen of a first furnace stationed to be fed by the hopper with the laterally exterior surface of column in extensive guiding contact with an inner peripheral sidewall surface which defines said lumen, heating the increment therein in a reducing atmosphere;

squeezing an increment of the column laterally inwardly and pulling the heated column axially forwardly at a first squeezing and pulling site axially downstream of the first furnace;

said heating, squeezing and pulling, in combination, continuously providing a column with an average of about 40–50 percent full density and which is sufficiently consolidated to be laterally self-supporting;

surrounding an increment of said column, axially downstream of said first squeezing and pulling site with the lumen of a second furnace and heating this increment therein in a reducing atmosphere;

squeezing an increment of the column laterally inwardly and pulling the heated column axially forwardly at a second squeezing and pulling site axially downstream of the second furnace;

the last-described heating, squeezing and pulling, in combination, continuously providing a column with an average of about 70–99 percent full density, including a perimetrically complete laterally outer peripheral surface region which is substantially fully dense to a depth of at least one-sixteenth inch as an integral seal therefor.

2. The method of claim 1, further including:
the subsequent steps of:
severing the integrally sealed column into a plurality of axially succeeding billets, and
means for squeezing each billet at each end thereof sufficiently to make each billet substantially fully dense across each end thereof, so that each billet is substantially fully self-encapsulated and has an average of about 80–99 percent full density.

3. The method of claim 1, wherein:
the regularized scrap metal particles are made of steel.

4. The method of claim 1, wherein:
at least a majority, by weight, of the particles are of sheet steel scrap having a thickness of from about 0.035 to about 0.090 inch and a maximum width of about 4 inches across.

5. The method of claim 4, wherein:
the remainder of said particles, are of obsolete steel scrap having a maximum size on the order of that of a small adult fist.

6. The method of claim 3, wherein:
as a preliminary step, said particles are subjected to cleaning to remove debris therefrom typified by paint, aluminum, lacquer, rubber and plastics material.

7. The method of claim 3, wherein:
the inner peripheral sidewall surface of said lumen of said first furnace is made of non-magnetic material and said column is electrically, inductively heated in said first furnace to a maximum temperature which lies below the temperature at which the non-magnetic material becomes sufficiently tacky as to tentatively fuse to said column.

8. The method of claim 7, wherein:
said maximum temperature is about 1950° F.

9. The method of claim 7, wherein:
at the first squeezing and pulling site, the column is repeatedly engaged by a traction forge which cyclically squeezes, pulls the column axially forwards, retreats laterally away from the column, retracts upstream and engages the column for the next squeeze.

10. The method of claim 9, wherein:
the proportion of how much the column is pulled axially forwards in each such cycle to the throughput of said method of is equivalent to about 120 feet per hour to about 170 feet per hour to five tons per hour.

11. The method of claim 9, wherein:
the magnitude of said squeezing at said first squeezing and pulling site, at the laterally exterior surface of said column, is from about 3500 p.s.i. to about 12,500 p.s.i.

12. The method of claim 9, wherein:
the squeezing at said first squeezing and pulling site reduces the transverse cross-sectional area of the column by an amount on the order provided by the ratio 125:49.

13. The method of claim 3, wherein:
within the second furnace, the column remains physically spaced from contact with an inner peripheral furnace wall defining said lumen thereof by an amount on the order of at least one-fourth inch.

14. The method of claim 13, wherein:
within the second furnace, the column is electrically inductively heated to a maximum temperature on the order of 2450° F.

15. The method of claim 14, wherein:
at the second squeezing and pulling site, the column is repeatedly engaged by a traction forge which cyclically squeezes, pulls the column axially forwards, retreats laterally away from the column, retracts upstream and engages the column for the next squeeze.

16. The method of claim 15, wherein:
the proportion of how much the column is pulled axially forwards in each such cycle at the second squeezing and pulling site to the throughput of said method is equivalent to about 120 feet per hour to about 170 feet per hour to five tons per hour.

17. The method of claim 15, wherein:
the magnitude of said squeezing at said second squeezing and pulling site, at the laterally exterior surface of said column, is from about 3,500 p.s.i. to about 35,000 p.s.i.

18. The method of claim 15, wherein:
the squeezing at said second squeezing and pulling site substantially reduces the transverse cross-sectional area of the column.

19. The method of claim 1, wherein:
both of the heating steps are conducted electrically inductively, the first at a frequency in the range of 15 to 10,000 hertz and the second at a frequency in the range of 25 to 1000 hertz.

20. The method of claim 19, wherein:
the column emerging from the second squeezing and pulling site is fully dense to a maximum depth of about 0.75 inches.

21. A process for continously hot-baling steel scrap, comprising:
providing a supply of steel scrap organized into a forwardly moving column of up to 25 percent full density;
continuously passing the column through a station, which encloses a reducing atmosphere and electrically inductively heating the scrap steel from exteriorly of said column, at an electrical frequency of 15–10,000 hertz, causing the exterior of the column to become hotter than the core thereof as said column passes through said station, this heating step being carried out sufficiently strongly as to raise the temperature of the exterior of the column to a level where, if the column were to be laterally squeezed and forwardly pulled by an amount sufficient to raise the density thereof to approximately 50 percent, the column would, as a consequence of such squeezing and pulling while in such a differentially heated condition, become sufficiently consolidated as to become laterally self-supporting, yet insufficiently strongly that as to cause the column to become exteriorly tacky within said station; and immediately downstream of said station, squeezing and pulling said column by said sufficient amount to produce a forwardly moving continuous hot bale thereof.

* * * * *